Patented July 21, 1942

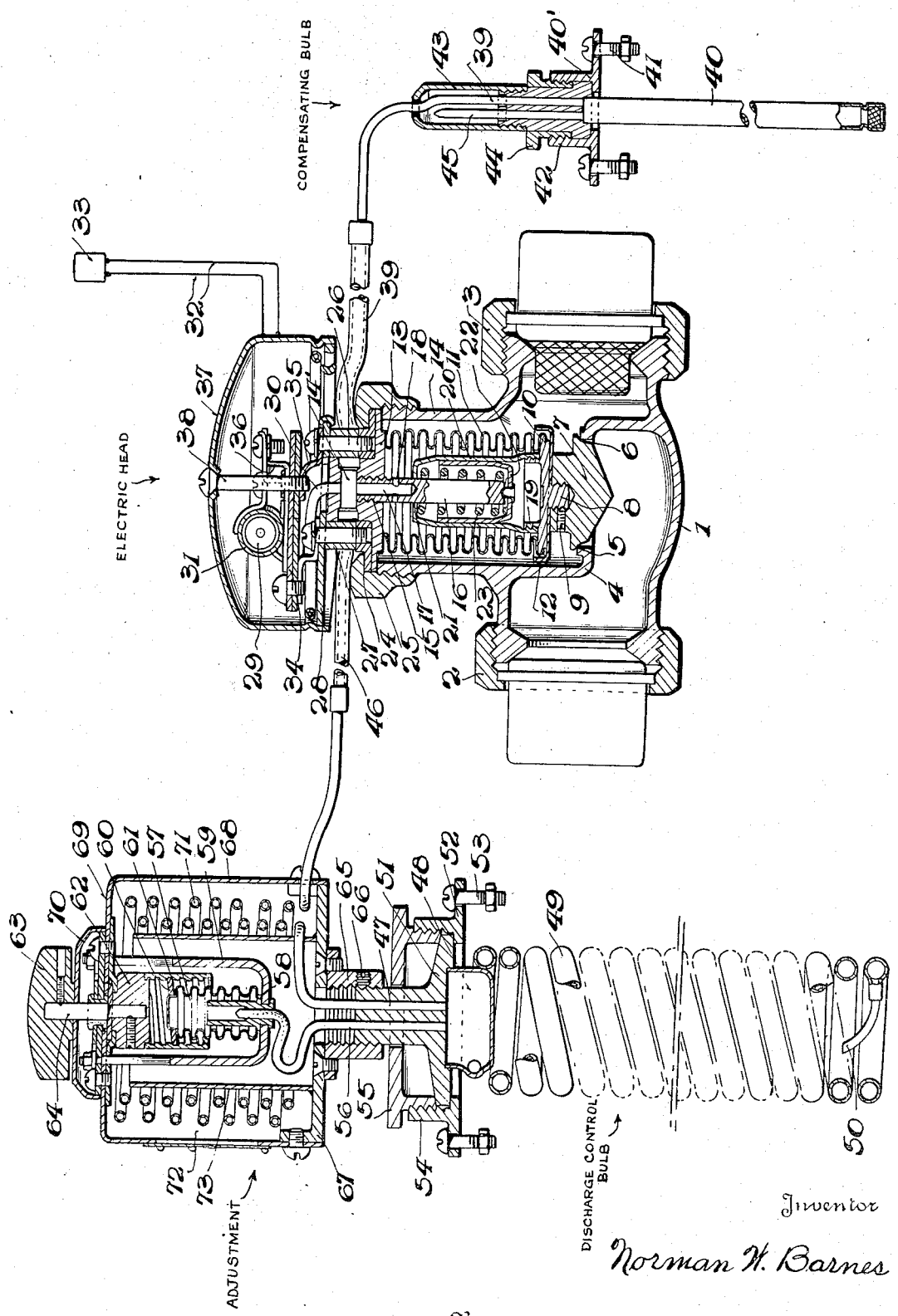

2,290,153

UNITED STATES PATENT OFFICE 2,290,153

TEMPERATURE CONTROLLING DEVICE

Norman W. Barnes, Knoxville, Tenn., assignor to The Fulton Sylphon Company, Knoxville, Tenn., a corporation of Delaware Application June 27, 1939, Serial No. 281,489

9 Claims. (Cl. 236—91)

This invention relates to temperature controlling devices, and more particularly to means for controlling the supply of heating medium to heat interchanging means that imparts the desired temperature to air employed for conditioning the interior of a room, building, compartment, car, or other space whose temperature is to be controlled.

In the following description the invention will be described as applied to controlling the temperature of air employed for heating the space in question, the invention being exemplified by the control of a valve for regulating the amount of steam that is supplied to a heating coil over which the air is passed, and which may be conveniently located in an air duct of a suitable heating and ventilating system, but as will be apparent to those skilled in the art, the invention is not restricted to this particular use, as other suitable uses for the temperature controlling means of the present invention are contemplated.

As will be appreciated, tempering of the incoming air to a minimum temperature that will avoid unpleasant drafts is highly desirable. On the other hand, when the space in question requires heat in order to maintain a predetermined minimum temperature, it is important that the incoming air be promptly raised to a fairly high temperature so that there may not be an undue delay in restoring the space to the desired temperature. Furthermore, the amount of heat delivered to the air should vary with the temperature of the incoming air, particularly where the temperature of the incoming air reflects the heat loss due to the heat differential between the desired temperature within the space and the exterior thereof, both for the minimum temperature that is maintained in the incoming air when that air is being merely tempered and for the temperature that is given the air when additional heat is desired to raise or restore the temperature to the desired value.

It is an object of this invention to provide an improved temperature controlling device which automatically maintains the air entering the space to be heated at either a predetermined maximum or a predetermined minimum temperature, depending upon whether or not the temperature of the space in question is below the desired temperature, and which at the same time automatically varies both the minimum and maximum temperatures referred to in accordance with variations in temperature of the incoming air.

Another object of this invention is to provide a device of the type characterized which employs a single element for effecting the control of the supply of heating medium, but which single element is itself under the control of the temperature of the air in the space to be heated and also the temperatures of the air flowing to and away from the air heating unit.

Another object of this invention is to provide a device of the type characterized which may be employed to lock the heating element out of operation under certain temperature conditions, as when the space in question is to be maintained at a relatively low temperature, as when air cooling is employed.

Another object of this invention is to provide a device of the type characterized which may be readily adjusted to vary the maximum and minimum temperatures as aforesaid at which the air is to be delivered to the space in question.

Another object of this invention is to provide a device of the type characterized which is relatively simple and compact in structure, highly efficient in operation, strong and durable in service, and easily installed and manipulated.

Other objects will appear as the description of the invention proceeds.

The invention is capable of receiving a variety of mechanical expressions, one of which is illustrated on the accompanying drawing which illustrates somewhat diagrammatically, and partly in elevation and partly in section, an embodiment of the present invention as employed for controlling the flow of a heating medium, as steam, to a heating unit, as a steam heating coil, suitably disposed in an air duct leading to the space to be heated. It is to be expressly understood, however, that the drawing is for purposes of illustration only, and is not to be construed as a definition of the limits of the invention, reference being had to the appended claims for that purpose.

In the embodiment illustrated a valve casing 1 is shown as disposed in any suitable steam line to which it is connected by couplings 2 and 3 and through which steam flows to say a steam heating coil disposed in the air inlet duct of a suitable ventilating system. Valve casing 1 has interiorly thereof a partition 4 providing a valve seat 5 around the port 6 and with which cooperates a valve member 7 of any suitable construction suitably attached, as by the threaded stud 8 and lock screw 9, to the end wall 10 of an expansible and collapsible corrugated tubular element or bellows 11. Interposed between the valve member 7 and the end wall 10 is a cup-shaped member 12, conveniently formed of sheet metal, which protects the end of the corrugated element 11 from the erosive action of the steam.

The opposite end of said corrugated element 11 is suitably attached to an end wall 13 secured in position on the end of the tubular portion 14 of the housing 1, so as to make a fluid-tight joint therewith.

End member 13 has a centrally arranged screwthreaded aperture 15 which receives a post or stem 16 that has an axial bore 17 that communicates through one or more apertures 18 with the interior of the corrugated element 11. End wall 10 has an inwardly directed and exteriorly threaded flange 19 on which is threadedly mounted a thimble 20 having its end wall centrally apertured at 21 to slide on the post 16. Attached to the end of said post 16 is a second thimble 22 adapted to slide within the thimble 20. Interposed between the end walls of the two thimbles 20 and 22 is a coil spring 23 which, as will be apparent, normally urges the end wall 10 upwardly, as viewed in the drawing, so as to collapse corrugated element 11 and open the valve 7. The coaction of said two thimbles, together with the coaction of the outer thimble with the post 16, assures that the valve 7 will have rectilinear movement with respect to its seat 5.

Surrounding a central boss on the end member 13 is an annular element 24 which, together with said end member 13, is shown as secured in position by an annular nut 25 threaded onto the end of the tubular portion 14 of valve casing 1. Attached to said annular member 24, preferably by a plurality of screws 26, and spaced therefrom by interposed sleeves 27 is the support 28 of an electrically heated bulb 29 which communicates through capillary tube 30 with the bore 17 of the post 16. The bulb 29 is surrounded or has suitably associated therewith a heating coil 31 provided with leads 32 which extend to any suitable electrical thermostat of the make-and-break contact type such as may be conveniently installed on the wall of the space to be heated and which is here diagrammatically indicated by the rectangle 33. As shown, said bulb and its coil are mounted on an inner support 34 carried from the support 28 by suitable brackets 35, said support 34 in turn carrying a suitable bracket 36 for a clamp that secures the bulb and coil in position, and suitable attachments for the leads 32, etc., are also provided, these interior details of construction forming no part of the present invention inasmuch as they may be of any suitable character. The electrically heated bulb and its support are preferably enclosed in a cover 37 that may be secured in position by the screw 38.

Also communicating with the bore 17 and post 16 is a capillary tube 39 leading to a bulb 40 which may be supported in any suitable way at the air inlet side of the heating coil referred to, as by means of a member 40' that may be attached exteriorly to the wall of the air duct, as by a plurality of bolts 41, said member 40' having an interiorly threaded flange 42 in which a thimble 43 is secured by the annular nut 44. Member 43 prevents the capillary tube 39 from being given a sharp bend where it passes through the wall of the air duct, and as shown it is made of such size as to also enclose the sealed end of the filling tube 45.

Also communicating with the bore 17 of the post 16 is a third capillary tube 46 which leads to the end chamber 48 of a bulb 49 which is of materially larger capacity than the bulb 40 and which, in order to give it compactness, is preferably formed as a coil, said bulb having a sealed filling tube indicated at 50. Bulb 48, 49 is attached to an end member 51 which may be mounted in any suitable way so as to project bulb 49 into the air duct at the outlet side of the heating coil, the structure illustrated including a supporting member 52 which may be attached to the exterior of the duct, as by a plurality of bolts 53, and which has an interiorly threaded flange 54 in which the member 51 is secured by a threaded nut or cover member 55.

The adjusting means for the system so far described is preferably associated with the bulb 49, and to this end a fourth capillary tube 56 communicates with the chamber 48 at one end, and at its opposite end said tube communicates with an expansible and collapsible corrugated tubular element or bellows 57 having one end wall 58 fixedly secured in position, as by a U-shaped bracket 59, and its opposite or movable end wall 60 in the form of a plate whose periphery is adapted to engage in the interior threads of a sleeve 61 mounted on a block 62 and rotatable by means of a knob 63 on a spindle 64 to which block 62 and knob 63 are attached as by means of set screws. The adjusting mechanism so far described is mounted by means of a threaded sleeve 65 on the exteriorly threaded end of member 51, to which it is attached as by a set screw 66, said sleeve 65 having attached thereto the end plate 67 of a housing 68 to whose end wall 69 is attached the U-shaped bracket 59 and with which may be associated any suitable indicated mechanism 70 to show the state of adjustment of the expansible and collapsible chamber 57—the details of the indicating mechanism forming no part of the present invention.

In order to provide that the bulb 49 and its adjusting mechanism may be disposed at varying distances from the valve casing 1 and its associated electrically heated bulb, the capillary tube 46 is preferably made of such length as to provide for the most remote installation of the bulb 49, and to this end it is coiled as shown at 71 within the chamber 72 provided between the outer housing wall 68 and an inner concentrically arranged wall 73. When installed, so much of the capillary tube 46 is withdrawn from the coil 71 as is necessary to enable the bulb 49 to be disposed at the desired distance from the valve casing 1. As the valve casing 1 will ordinarily be adjacent the inlet side of the steam coil and therefore adjacent the bulb 40, no similar provision is ordinarily necessary for the capillary tube 39 but it is apparent that if desired a similar coil of capillary tubing could be provided at the bulb 40, as by enlarging the member 43 so as to constitute a housing therefor.

The system composed of the adjusting chamber 57 with its capillary tube 56, the bulbs 49, 40 and 29 with their capillary tubes 46, 39 and 30, respectively, and the bellows 11, is charged with a vaporizable liquid which normally fills chamber 57 and said bulbs and at least part of said last named capillary tubes, the extent to which the liquid columns approach the ends of the latter capillary tubes being varied by manipulating the knob 63 to expand or contract the ductility less important, the amount of iron may be greater.

The grain refining elements are particularly desirable in an aluminum alloy containing iron, manganese, chromium and the ternary compound. Although the iron itself improves the properties of the alloy, the manganese, chromium and grain refining elements exert a still further improvement independently of iron.

The aluminum alloys of the present invention containing magnesium, uncombined with silicon, and zinc in the proportion of a ternary compound, when cast in molds of a design such that chilling takes place substantially simultaneously in the various portions of the casting, solidify without the use of grain refining agents to form good castings. However, it has been found that certain grain refining elements substantially improve the properties of the aluminum alloy containing the ternary compound, whether or not it contains one or more of the above hardening metals, with or without iron. This is especially true when the metal is cast in molds of more or less intricate shape where the chilling may not be so uniform throughout the casting.

The grain refiners which I have found exert greatest improvement in the properties of the alloys are members of the group consisting of boron in the amount of .005% to .1% zirconium in the amount of .01% to .5%, tungsten in the amount of .01% to .5%, molybdenum in the amount of .01% to .5%, vanadium in the amount of .01% to .5%, titanium in the amount of .05% to .5%, columbium in the amount of .01% to .5% and tantalum in the amount of .05% to .5%. These grain refining elements should preferably be present in a total amount of from .005% to .5% and it is frequently desirable to have more than one of these elements present in a given alloy.

While the grain refiners in the above group are desirable in the alloys of the present invention, not all of the grain refiners affect the properties in the same way. The particular refiner or group of refiners selected in any given instance depends upon the particular condition which must be satisfied. The grain refiners selected from the group consisting of titanium, tungsten, molybdenum, zirconium and vanadium, and especially tungsten and molybdenum, improve both the strength and the elongation of the castings. Titanium being readily available is frequently used, but when special properties of the fabricated article are important it is desirable to select the grain refiner that is most suitable for such properties. The grain refiners boron, columbium and tantalum may advantageously be used where appearance, finish and corrosion resistance are important.

The above described hardening elements, manganese and chromium, substantially decrease the hot shortness, improve the properties of the alloy, and assist in maintaining the improved properties at high temperatures such as are encountered in internal combustion engines. The above grain refining elements, particularly members of the group consisting of zirconium, tungsten, molybdenum, vanadium and titanium, also have this property particularly when present in larger amounts, such as .2% or .3% or so. It may, therefore, be desirable to have up to .5% or so of these latter elements present.

The following examples illustrate the alloys of the present invention:

*Example 1*

An aluminum base alloy containing about .6% iron, about .3% manganese, about .2% chromium, about .2% titanium, about .2% silicon, and magnesium in proportion to combine with the silicon and to form .6% of the ternary compound $Al_3Mg_7Zn_6$, with the balance substantially aluminum and minor impurities, was prepared and chill cast into test bars, quenched and aged seven days at room temperature. When tested they showed a tensile strength of 43,300 lbs./sq. in., an elongation of 10.3%, a yield strength of 24,300 lbs./sq. in., a proportional limit of 18,100 lbs./sq. in., and a Rockwell hardness of 81. When the castings were simply air cooled and aged seven days at room temperature, the tensile strength was 41,000 lbs./sq. in., the yield strength was 24,500 lbs./sq. in., the proportional limit was 19,000 lbs./sq. in., the hardness was 80 Rockwell E, and the elongation was 8.5%.

*Example 2*

An aluminum base alloy containing about 6% of the ternary compound, about .3% manganese, about .25% chromium, about .2 silicon, about .3% iron, and about .3% tungsten was chill cast into test bars, which were quenched and aged three hours at 125° C. When tested, these bars had a tensile strength of 40,600 lbs./sq. in., a yield strength of 25,800 lbs./sq. in., a proportional limit of 16,500 lbs./sq. in., and an elongation of 13.2%, and a hardness of 76 Rockwell E. When the chill cast bars were quenched and aged seven days at room temperature, they had a tensile strength of 43,300 lbs./sq. in., a yield strength of 26,500 lbs./sq. in., a proportional limit of 18,400 lbs./sq. in., an elongation of 13%, and a hardness of 79 Rockwell E. When the grain refiner is omitted, the tensile strength and elongation are lower and the castability is decreased.

*Example 3*

When the alloy of Example 2 contained .03% vanadium instead of tungsten, the test bars which were chill cast, quenched and aged seven days at room temperature had a hardness of 74, an elongation of 8.7%, a proportional limit of 16,500 lbs./sq. in., a yield strength of 24,900 lbs./sq. in., and a tensile strength of 38,800 lbs./sq. in. When the percentage of vanadium was increased to .15%, the hardness was 80, the elongation was 8.5%, the proportional limit was 17,700 lbs./sq. in., the yield strength was 25,500 lbs./sq. in., and the tensile strength was 40,400 lbs./sq. in.

*Example 4*

When in the alloy of Example 2 the tungsten was substituted by .06% molybdenum, the elongation of the test bars which were chill cast, quenched and aged seven days at room temperature was 11.2%, the proportional limit was 18,100 lbs./sq. in., the yield strength was 25,800 lbs./sq. in., and the tensile strength was 42,000 lbs./sq. in. When the test bars were simply air cooled and aged seven days at room temperature, the elongation was 9.3%, the proportional limit was 18,200 lbs./sq. in., the yield strength was 25,800 lbs./sq. in., and the tensile strength was 40,600 lbs./sq. in. When the molybdenum was increased to .12%, test bars which were chill cast, quenched and aged seven days at room temperature had an elongation of 12.4%, a proportional limit of 16,700 lbs.sq. in., a yield strength of 24,500 lbs./sq. in., and a tensile strength of 41,400 lbs./sq. in.

and 70° F. for a minimum temperature and 120° F. and 140° F. for a maximum temperature, depending upon the intermediate temperature at the bulb 40.

By manipulation of the expansible and collapsible chamber 57 the amount of liquid responsive to temperature variations can be changed and therefore the minimum and maximum temperatures can be correspondingly varied, but whatever the condition of adjustment at the chamber 57, the air leaving the heating coil at bulb 49 will be maintained at either a minimum or a maximum temperature depending upon whether the coil 31 is or is not energized by reason of the condition of the room thermostat. While the position of the valve member 7 will be modulated by the temperature at the bulb 49 to maintain predetermined minimum and maximum temperatures, depending upon the energization of the coil 31, these minimum and maximum temperatures will be varied as the heat differential varies between the actual temperature at the bulb 40 and the intended temperature at the bulb 49.

While certain temperatures have heretofore been assumed for purposes of illustration, it is to be expressly understood that the invention is not restricted thereto, as the volumes of the bulbs 29, 40 and 49 may be readily varied as desired to obtain the desired difference between minimum and maximum temperatures.

It will therefore be perceived that the present invention provides means for automatically varying the temperature between predetermined minimum and maximum temperatures, depending upon the temperature of the space to be heated, and also means for automatically varying both the minimum and maximum temperatures depending upon variations in the differential between the temperature of the air to be heated and the temperature which it is desired that the air attain. It will further be noted that the aforesaid automatic control is effected by means of a single actuating element for the valve or other controlling means to be used, all of the several temperature responsive elements being directly connected therewith, whereby the complexities of a plurality of interrelated controls have been eliminated. At the same time, provision has been made for readily adjusting the instrument to predetermine what the minimum and maximum temperatures shall be, and the entire control is effected by a device which is relatively simple and compact, easy to install and manipulate, and highly efficient as well as durable in operation.

While the illustrated embodiment has been described with particular reference to predetermining the temperature of air flowing over a heating coil, as in a ventilating system, other uses of the invention will now readily suggest themselves to those skilled in the art. For example, the thermostat 33 may be so constructed that the coil 31 is actuated only at a predetermined relatively low temperature, in which event the bulbs 40 and 49 may be used for controlling the inlet and outlet temperatures in a heating system and the coil 31 may be actuated from the thermostat 33 if an air cooling system goes into effect, so as to effect the closure of the valve 7 and thereby prevent under all normal conditions the valve 7 being actuated by either of the bulbs 40 and 49 to heat the air as long as the cooling system is in operation.

While the embodiment of the invention illustrated on the drawing has been described with considerable detail, the invention is not restricted thereto. For example, any suitable valve mechanism may be employed for controlling the flow of heating medium, or other than valves may be used for regulating the heat exchanger. Similarly, other forms of bulbs, adjusting means, etc., may be employed and if desired the adjusting means may be entirely omitted. Changes may be made in the details of construction, arrangement and proportion of parts, and certain features may be used without other features, without departing from the spirit of this invention. Reference is therefore to be had to the appended claims for a definition of said invention.

What is claimed is:

1. A device for automatically maintaining the temperature of medium delivered to an enclosure at either a predetermined maximum or a predetermined minimum temperature comprising a heat exchanger for supplying heat to the medium, controlling means for said heat exchanger, an expansible and contractible motor chamber operatively connected to said controlling means and subjected to heat at said exchanger for vaporizing a vaporizable liquid, means under the control of the temperature in said enclosure and operative only to inject into or withdraw from said motor chamber a predetermined quantity of vaporizable liquid to automatically determine whether said motor chamber shall be in only the one or the other of its two conditions corresponding to the maintenance of maximum or minimum temperatures, and means subjected to the heat of the medium flowing from said heat exchanger for additionally injecting or withdrawing vaporizable liquid into or from said motor chamber for modulating the condition of said motor chamber and the position of said controlling means at either the maximum or the minimum condition of said motor chamber to automatically predetermine the temperature being maintained thereby.

2. A device for automatically maintaining the temperature of medium delivered to an enclosure at either a predetermined maximum or a predetermined minimum temperature comprising a heat exchanger for supplying heat to the medium, controlling means for said heat exchanger, an expansible and contractible motor chamber operatively connected to said controlling means and subjected to heat at said exchanger for vaporizing a vaporizable liquid, means under the control of the temperature in said enclosure and operative only to inject into or withdraw from said motor chamber a predetermined quantity of vaporizable liquid to automatically determine whether said motor chamber shall be in only the one or the other of its two conditions corresponding to the maintenance of maximum or minimum temperatures, means subjected to the heat of the medium flowing from said heat exchanger for additionally injecting or withdrawing vaporizable liquid into or from said motor chamber for modulating the condition of said motor chamber and the position of said controlling means at either the maximum or the minimum condition of said motor chamber to automatically predetermine the temperature being maintained thereby, and means subjected to the temperature of the medium approaching said heat exchanger for automatically varying the maximum and minimum temperatures maintained by said last named means.

3. A device for automatically maintaining the temperature of medium delivered to an enclosure at either a predetermined maximum or a predetermined minimum temperature comprising a heat exchanger for supplying heat to the medium, controlling means for said heat exchanger, an expansible and contractible motor chamber operatively connected to said controlling means and subjected to heat at said exchanger for vaporizing a vaporizable liquid, means under the control of the temperature in said enclosure and operative only to inject into or withdraw from said motor chamber a predetermined quantity of vaporizable liquid to automatically determine whether said motor chamber shall be in only the one or the other of its two conditions corresponding to the maintenance of maximum or minimum temperatures, means subjected to the heat of the medium flowing from said heat exchanger for additionally injecting or withdrawing vaporizable liquid into or from said motor chamber for modulating the condition of said motor chamber and the position of said controlling means at either the maximum or the minimum condition of said motor chamber to automatically predetermine the temperature being maintained thereby, and a second means subjected to the heat of the medium approaching said heat exchanger for additionally injecting or withdrawing vaporizable liquid into or from said motor chamber for predetermining the increment of temperature of said medium leaving said heat exchanger over the temperature of said medium approaching said heat exchanger.

4. A device for automatically maintaining the temperature of medium delivered to an enclosure at either a predetermined maximum or a predetermined minimum temperature comprising a heat exchanger for supplying heat to the medium, controlling means for said heat exchanger, an expansible and contractible motor chamber operatively connected to said controlling means and subjected to heat at said exchanger for vaporizing a vaporizable liquid, means under the control of the temperature in said enclosure and operative only to inject into or withdraw from said motor chamber a predetermined quantity of vaporizable liquid to automatically determine whether said motor chamber shall be in only the one or the other of its two conditions corresponding to the maintenance of maximum or minimum temperatures, means subjected to the heat of the medium flowing from said heat exchanger for additionally injecting or withdrawing vaporizable liquid into or from said motor chamber for modulating the condition of said motor chamber and the position of said controlling means at either the maximum or the minimum condition of said motor chamber to automatically predetermine the temperature being maintained thereby, and manually adjustable means for varying the minimum and maximum temperatures to be maintained.

5. A device for automatically maintaining the temperature of medium delivered to an enclosure at either a predetermined maximum or a predetermined minimum temperature comprising a heat exchanger for supplying heat to the medium, controlling means for said heat exchanger, an expansible and contractible motor chamber operatively connected to said controlling means and subjected to heat at said exchanger for vaporizing a vaporizable liquid, means under the control of the temperature in said enclosure and operative only to inject into or withdraw from said motor chamber a predetermined quantity of vaporizable liquid to automatically determine whether said motor chamber shall be in only the one or the other of its two conditions corresponding to the maintenance of maximum or minimum temperatures, means subjected to the heat of the medium flowing from said heat exchanger for additionally injecting or withdrawing vaporizable liquid into or from said motor chamber for modulating the condition of said motor chamber and the position of said controlling means at either the maximum or the minimum condition of said motor chamber to automatically predetermine the temperature being maintained thereby, a second means subjected to the heat of the medium approaching said heat exchanger for additionally injecting or withdrawing vaporizable liquid into or from said motor chamber for predetermining the increment of temperature of said medium leaving said heat exchanger over the temperature of said medium approaching said heat exchanger, and manually adjustable means for varying the minimum and maximum temperatures to be maintained.

6. A device for automatically maintaining the temperature of medium delivered to an enclosure at either a predetermined maximum or a predetermined minimum temperature comprising a heat exchanger for supplying heat to the medium, controlling means for said heat exchanger, an expansible and contractible motor chamber operatively connected to said controlling means and subjected to heat at said exchanger for vaporizing a vaporizable liquid, a bulb for containing vaporizable liquid in communication with said motor chamber, a heating coil associated with said bulb, means under the control of the temperature in said enclosure for opening or closing the circuit through said heating coil, said bulb with its heating coil being operative only to inject a predetermined quantity of vaporizable liquid into said motor chamber or withdraw the same therefrom to automatically determine whether said motor chamber shall be in only the one or the other of its two conditions corresponding to the maintenance of maximum or minimum temperatures, and a second bulb subjected to the heat of the medium flowing from the heat exchanger for containing vaporizable liquid and operative to additionally inject or withdraw vaporizable liquid into or from said motor chamber for modulating the condition of said motor chamber and the position of said controlling means at either the maximum or the minimum conditions of said motor chamber to automatically predetermine the temperature being maintained thereby.

7. A device for automatically maintaining the temperature of medium delivered to an enclosure at either a predetermined maximum or a predetermined minimum temperature comprising a heat exchanger for supplying heat to the medium, controlling means for said heat exchanger, an expansible and contractible motor chamber operatively connected to said controlling means and subjected to heat at said exchanger for vaporizing a vaporizable liquid, a bulb for containing vaporizable liquid in communication with said motor chamber, a heating coil associated with said bulb, means under the control of the temperature in said enclosure for opening or closing the circuit through said heating coil, said bulb with its heating coil being operative only to inject a predetermined quantity of vaporizable liquid into said motor chamber or withdraw the same therefrom to automatically determine whether said motor chamber shall be in only the one or the other of its two conditions corresponding to the maintenance of maximum or minimum temperatures, a second bulb subjected to the heat of the medium flowing from the heat exchanger for containing vaporizable liquid and operative to additionally inject or withdraw vaporizable liquid into or from said motor chamber for modulating the condition of said motor chamber and the position of said controlling means at either the maximum or the minimum conditions of said motor chamber to automatically predetermine the temperature being maintained thereby, and a third bulb subjected to the heat of the medium approaching said heat exchanger for containing vaporizable liquid and operative to additionally inject or withdraw vaporizable liquid into or from said motor chamber to modify the increment of temperature in the medium flowing from said heat exchanger over the temperature of the medium approaching said heat exchanger.

8. A device for automatically maintaining the temperature of medium delivered to an enclosure at either a predetermined maximum or a predetermined minimum temperature comprising a heat exchanger for supplying heat to the medium, controlling means for said heat exchanger, an expansible and contractible motor chamber operatively connected to said controlling means and subjected to heat at said exchanger for vaporizing a vaporizable liquid, a bulb for containing vaporizable liquid in communication with said motor chamber, a heating coil associated with said bulb, means under the control of the temperature in said enclosure for opening or closing the circuit through said heating coil, said bulb with its heating coil being operative only to inject a predetermined quantity of vaporizable liquid into said motor chamber or withdraw the same therefrom to automatically determine whether said motor chamber shall be in only the one or the other of its two conditions corresponding to the maintenance of maximum or minimum temperatures, a second bulb subjected to the heat of the medium flowing from the heat exchanger for containing vaporizable liquid and operative to additionally inject or withdraw vaporizable liquid into or from said motor chamber for modulating the condition of said motor chamber and the position of said controlling means at either the maximum or the minimum conditions of said motor chamber to automatically predetermine the temperature being maintained thereby, and manually operable means for modifying the amount of vaporizable liquid responsive to said changes of temperature and thereby varying the minimum and maximum temperatures maintained by said last named means.

9. A device for automatically maintaining the temperature of medium delivered to an enclosure at either a predetermined maximum or a predetermined minimum temperature comprising a heat exchanger for supplying heat to the medium, controlling means for said heat exchanger, an expansible and contractible motor chamber operatively connected to said controlling means and subjected to heat at said exchanger for vaporizing a vaporizable liquid, a bulb for containing vaporizable liquid in communication with said motor chamber, a heating coil associated with said bulb, means under the control of the temperature in said enclosure for opening or closing the circuit through said heating coil, said bulb with its heating coil being operative only to inject a predetermined quantity of vaporizable liquid into said motor chamber or withdraw the same therefrom to automatically determine whether said motor chamber shall be in only the one or the other of its two conditions corresponding to the maintenance of maximum or minimum temperatures, a second bulb subjected to the heat of the medium flowing from the heat exchanger for containing vaporizable liquid and operative to additionally inject or withdraw vaporizable liquid into or from said motor chamber for modulating the condition of said motor chamber and the position of said controlling means at either the maximum or the minimum conditions of said motor chamber to automatically predetermine the temperature being maintained thereby, a third bulb subjected to the heat of the medium approaching said heat exchanger for containing vaporizable liquid and operative to additionally inject or withdraw vaporizable liquid into or from said motor chamber to modify the increment of temperature in the medium flowing from said heat exchanger over the temperature of the medium approaching said heat exchanger, and manually operable means for modifying the amount of vaporizable liquid responsive to said changes of temperature and thereby varying the minimum and maximum temperatures maintained by said last named means.

NORMAN W. BARNES.